US008522440B2

(12) United States Patent  
Ducret

(10) Patent No.: US 8,522,440 B2
(45) Date of Patent: Sep. 3, 2013

(54) ROTATING TOOL FOR HARDENED CABLE-PROTECTIVE SHIELD

(76) Inventor: Lucien C Ducret, Old Greenwich, CT (US)

(*) Notice: Subject to any disclaimer, the term of this patent is extended or adjusted under 35 U.S.C. 154(b) by 485 days.

(21) Appl. No.: 11/319,089

(22) Filed: Dec. 28, 2005

(65) Prior Publication Data

US 2007/0144011 A1    Jun. 28, 2007

(51) Int. Cl.
*B21F 13/00* (2006.01)
(52) U.S. Cl.
USPC ............... 30/90.8; 30/90.1; 81/9.4; 83/522.11
(58) Field of Classification Search
USPC .......... 30/90.1–90.4, 90.6, 90.7, 90.8, 92–95, 30/101, 102; 83/522.11, 522.15, 522.18, 83/602, 628; 81/9.4, 9.41–9.44
See application file for complete search history.

(56) References Cited

U.S. PATENT DOCUMENTS

| 1,806,582 | A | * | 5/1931 | Beutner | 30/390 |
| 2,989,806 | A | * | 6/1961 | Davis | 30/90.3 |
| 4,142,290 | A | * | 3/1979 | Ducret | 30/90.9 |
| 4,158,935 | A | * | 6/1979 | Robert | 451/359 |
| 4,977,671 | A | * | 12/1990 | Ducret | 30/90.2 |
| 5,070,615 | A | * | 12/1991 | Michael, III | 30/90.8 |
| 6,662,450 | B1 | | 12/2003 | Ducret | |
| 2005/0066528 | A1 | * | 3/2005 | Ducret | 30/90.2 |

* cited by examiner

*Primary Examiner* — Phong Nguyen

(57) ABSTRACT

The inventive tool for cutting a hardened shield of cables used in harsh environment is configured with a spindle support unit and a spindle unit which is pivotally mounted to the spindle support so as to controllably vary a depth at which a cutting wheel fixed to the spindle unit penetrates a cable.

11 Claims, 4 Drawing Sheets

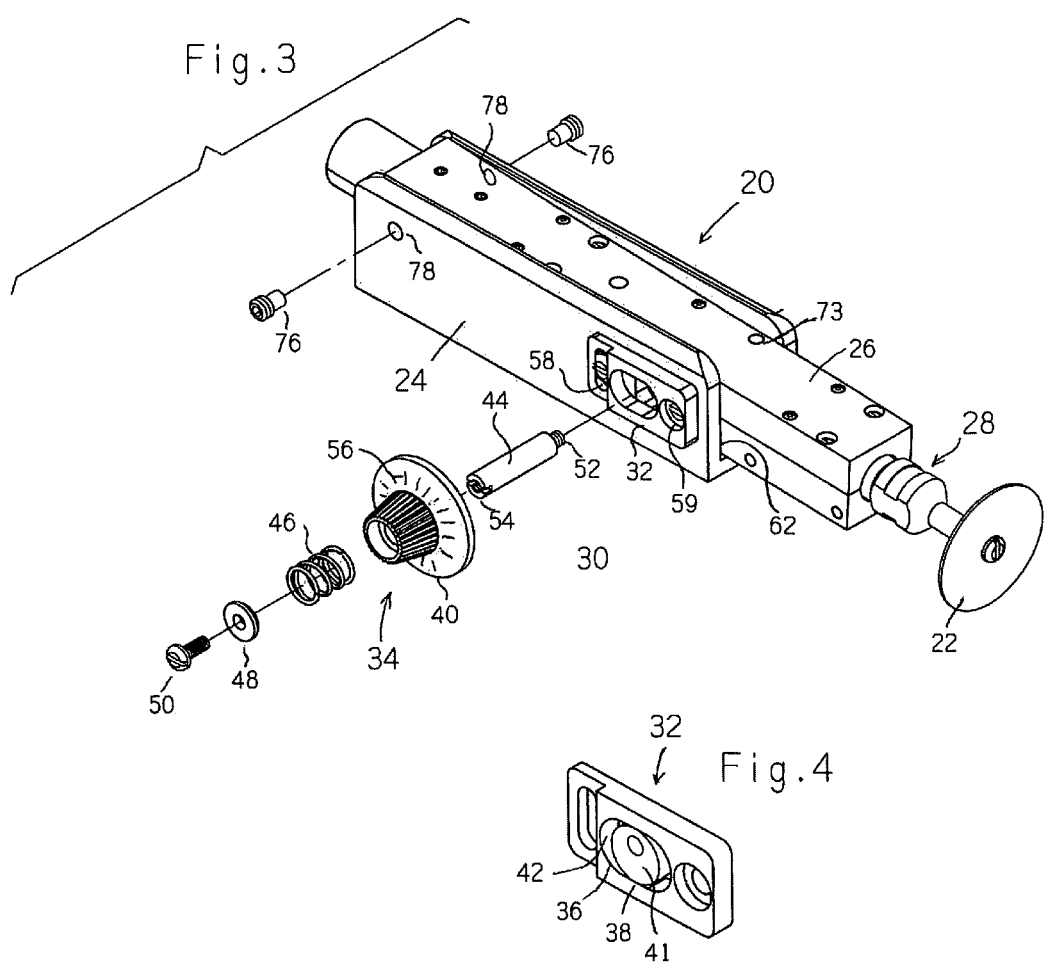

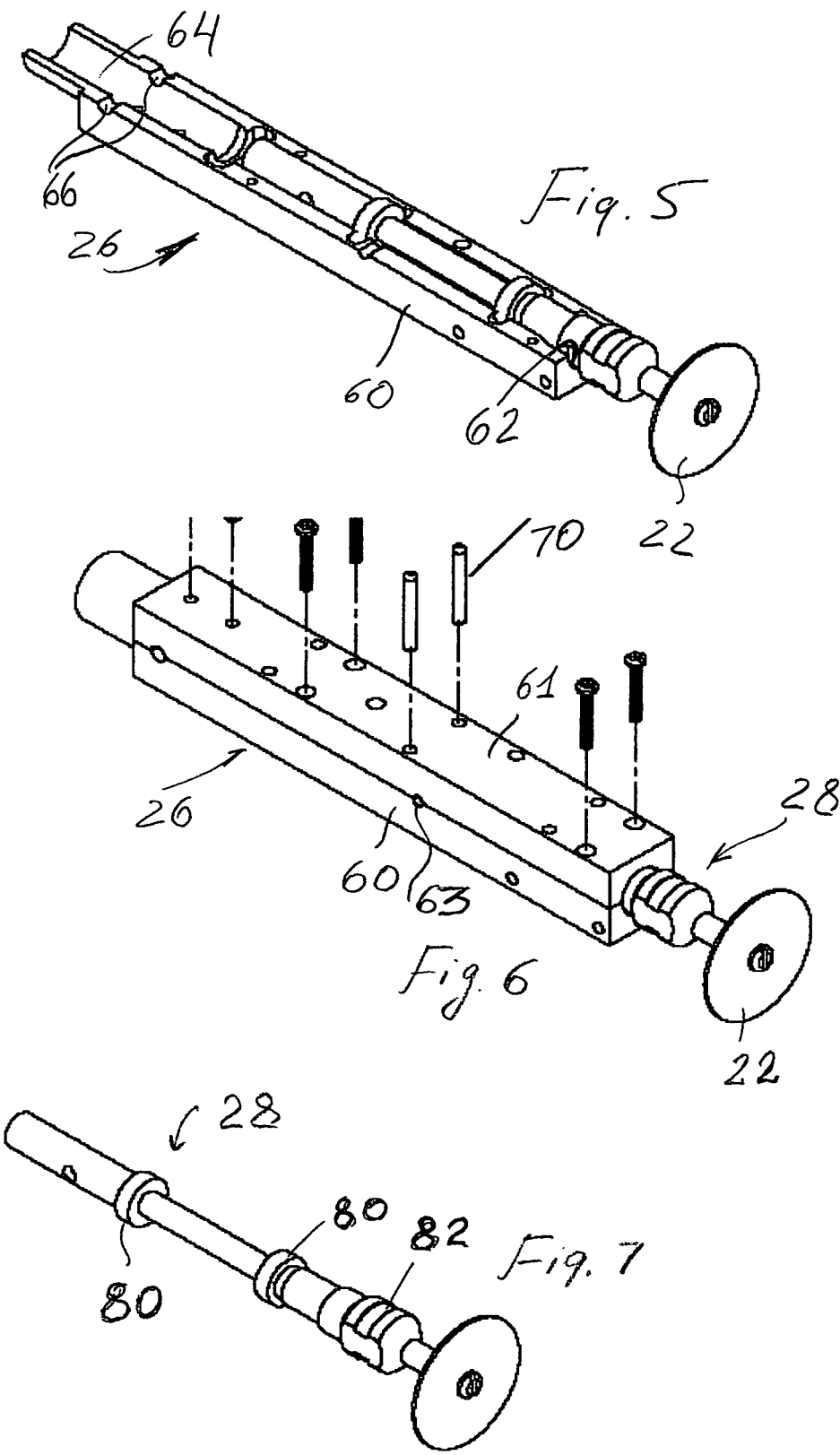

US 8,522,440 B2

ROTATING TOOL FOR HARDENED CABLE-PROTECTIVE SHIELD

BACKGROUND OF THE INVENTION

1. Field of the Invention

The invention relates to a rotating tool operable to cut a protective shield of cables used in a harsh environment.

2. The Prior Art

Cables used in a harsh environment characterized by high humidity, abnormal temperatures, mechanical shocks and substantial tensile forces need to be able to preserve their structural integrity over a long period of time. A typical structure of such cables is shown in FIG. 1 and configured with an outer jacket 10, a shield 12 of hardened high tensile wires, which surround a core 14 that, in turn, contains electrical conductors 16. To be electrically connected, shield 12 must be circumferentially cut without, however, damaging inner core 14. Known tools designed for stripping the shield of cables, which are used in normal environmental conditions, are not suitable for removing both hardened shield 12 and core 14. Typically, a combination of two or more conventional tools is used to sequentially cut hardened shield 12 and then to remove inner core 14. Such an operation is neither cost effective nor time efficient.

A need, therefore, exists for a tool specifically designed to process cables which are used in harsh environment.

SUMMARY OF THE INVENTION

This need is met by the inventive tool operable to sequentially cut a hardened shield and core of a cable by selectively setting the desired depth at which a cutting wheel penetrates the cable. The tool assembly is configured with a spindle support unit supporting a spindle unit which guides and actuates the cutting wheel.

The spindle support unit has a length adjusting unit allowing the user to introduce only the desirable length of a cable to be processed. The structure of the adjusting is disclosed in U.S. Pat. No. 6,662,450 which is commonly owned with the present application and is, thus, fully incorporated herein by reference. The spindle unit includes a bracket mounted to the body of the spindle support unit in a predetermined fixed position, which is maintained without modification during a cutting operation, and a spindle housing provided with a shaft and cutting wheel unit. A guide unit configured between the spindle support unit and the spindle housing is operable to controllably vary an angular position between the shaft unit and the spindle support unit so as to penetrate a cable at various depths without damaging electrical connectors.

BRIEF DESCRIPTION OF THE DRAWINGS

The above and other features and advantages of the invention will become more apparent from the following specific description taken in conjunction with the drawings, in which:

FIG. 3 is an exploded isometric view of a spindle unit of the inventive tool of FIG. 2;

FIG. 4 is an isometric view of a guide unit of the spindle unit of FIG. 3;

FIG. 5 is an isometric view of a low housing half supporting a shaft unit of the spindle unit of FIG. 3;

FIG. 6 is an isometric view of the assembled housing of the spindle unit of FIG. 3;

FIG. 7 is an isometric view of the shaft unit of FIG. 5; and

SPECIFIC DESCRIPTION

Figure 1:
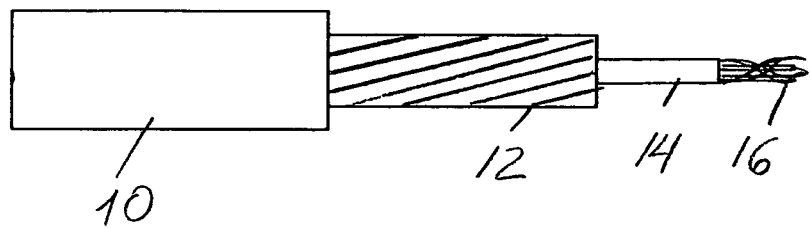
FIG. 1. is an elevated view of a cable used in harsh environment.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, inner, outer, above, below, beneath, rear, and front may be used with respect to the drawings. These and similar directional terms should not be construed to limit the scope of the invention in any manner. The word "couple," and similar terms with their inflectional morphemes do not necessarily denote direct and immediate connections, but also include connections through mediate elements or devices.

Figure 2:
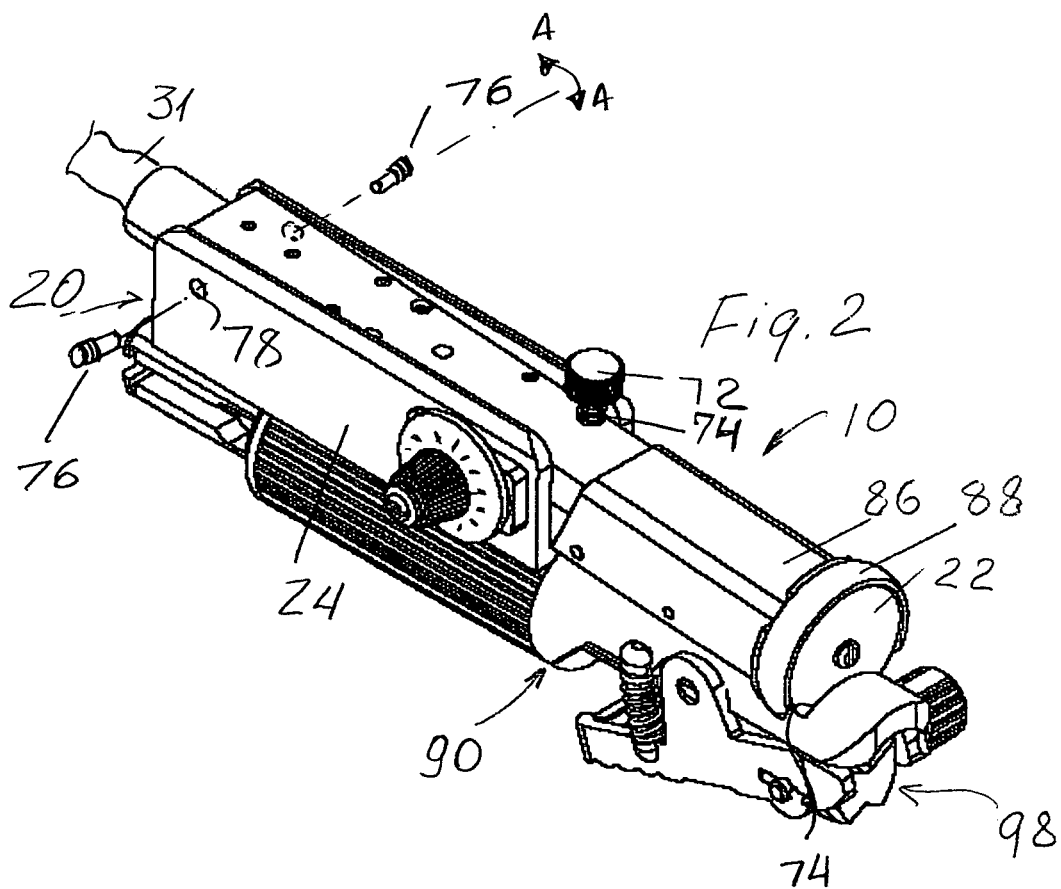
FIG. 2 is an isometric view of the inventive tool.

FIG. 2 illustrates the inventive rotating tool 10 including a spindle support unit 90 and a spindle unit 20 which has, among other components, an elongated housing 26 extending between the opposite ends thereof along a longitudinal axis. The spindle unit 20 is removably mounted on support 90 about an axis A-A, so as to controllably vary a depth at which a cutting wheel 22 so as to controllably vary a depth at which a cutting wheel 22 penetrates a cable 31 held by a cable holder 98 of support unit 90, as will be disclosed below. The wheel 22 rotates about the longitudinal axis of housing 26 so as to make a transverse cut on cable 31.

An assembly operable to controllably vary a depth, at which cutting wheel 22 penetrates a cable, includes a thumb screw 72 (FIG. 2) and an actuating assembly having a bracket 24 and a guide unit 30 (FIG. 3). Since thumb screw 72 is offset from the shaft unit 28, the screw 72 penetrates housing 26 through an opening 73 (FIG. 3) and presses against the bottom of bracket 24.

When cutting wheel 22 is not excessively worn out, the desired depth is initially established by having thumb screw 72 press the bottom of bracket 24. If the desired depth needs to be more or less deep than the previously established position, the user screws thumb 72 in or out, respectively, and varies an angular position of housing 26 relative to bracket 24.

If cutting wheel is worn out and thumb screw 72 is fully screwed out, a further fine adjustment of the angular position is controlled by guide unit 30, as better illustrated in FIG. 2. The guide unit 30 includes a support plate 32 mounted on bracket 24, an actuating assembly 34 removably coupled to spindle housing 26.

A knob 40 (FIG. 3) of actuating assembly 34 has an eccentrically positioned element 41 (FIG. 4) which is nested in recess 42 of support plate 32 so as to rotatably engage flat region 38 and, thus, to produce a wobbling motion of knob 40 in response to a torque applied by the user to knob 40. The knob 40 is rotatably fixed with spindle housing 26 and, thus, when actuated, angularly displaces the housing and shaft unit 28 relative to bracket 24. The knob 40 and spindle housing 26 are coupled to one by a coupling unit including a post 44 coupled to eccentric 41, extending through recess 42 and through knob 40, a spring 46 mounted on post 44 and biasing the latter inwards, a washer 48 and a screw 50. The inner end of post 44 has a threaded pin 52 engaging a threaded formation 63 in housing 26 (FIG. 6), whereas an outer end 54 of post 44 is recessed so as to threadedly engage screw 50. The knob 40 has a scale 56 indicating an angular position of housing 26 relative to the rest of the structure.

Referring to FIG. 4, support plate 32 has recess 42 provided with a generally elliptical cross-section 36 which is provided with at least one cam flat region 38 and receives eccentric 41. The plate 32 further includes an elongated opening 58 and a substantially circular opening 59 both configured to receive respective fasteners for coupling plate 32 to bracket 24. Typically, plate 32 is mounted to bracket 24 so that a fastener traversing opening 58 is located substantially in the middle of this opening. If thumb screw 72 (FIG. 2) is located at the end of its stroke and further finer adjustment of the angular position by guide unit 30 is not possible because knob 40 is also at the end of its rotational stroke, the user loosens a fastener going through opening 58 and displaces the fattener fastener along opening 58 to provide housing unit 26 with additional room for tilting.

The bracket 24 is removably coupled to spindle support unit 90 by a variety of fastening elements, including for example, screws, bolts, pins and the like, and has a U-shaped cross-section open outwards to receive spindle housing 26. While bracket 24 is illustrated in FIG. 2 to be on top of spindle support unit 90, but the configuration of bracket 24 can be easily modified as readily understood by one of ordinary skills in the cable cutting art.

To allow housing 26 angular motion relative to bracket 24, the proximal end of spindle housing 26 is pivotally mounted to bracket 24 on a pair of pivot screws 76 engaging respective holes 78 in bracket 24. The pivot screws 76 are also received in respective notches 66 (FIG. 5) which are formed in the proximal end of housing 26 so as to surround the inner ends of screws 76 without arresting their rotation. Accordingly, when a torque is applied to thumb screw 72 or knob 40, housing 26 rotates about pivot screws 76 and displaces its distal end along an arcuate path thereby either lowering or elevating cutting wheel 22 relative to a cable. To provide synchronous displacement between screw 72 and housing unit 26, thumb screw 72 has a resilient component 74 biasing the screw outwards from housing 26.

While plate 32 is shown to be a separate component attachable to bracket 24 by a fastening assembly 54 (FIG. 3), recess 42 can be provided within the wall of bracket 24. Furthermore, knob 40 and post 52 can be integrally formed as a one-piece knob/post configuration FIG. 5 illustrates a lower half 60 of housing 26 and has a U-shaped trough 62 whose inner surface extends complementary to the peripheral surface of shaft unit 28. The proximal region of half 60 is configured with a sleeve half 64 housing power cord 31 (FIG. 2) connected to shaft unit 28.

FIG. 6 shows housing 26 assembled of two halves 60 and 61, wherein upper half 61 is configured identically to lower half 60. The halves 60 and 61 are coupled together by a plurality of fasteners 70 penetrating through respective aligned holes in the halves. Upon coupling, halves 60 and 61 enclose shaft unit 28 in such a way that the shaft unit rotates upon being powered.

FIG. 7 illustrates shaft unit 28 provided with a pair of spaced apart ball bearing 80, which are supported by housing halves 60 and 61, a collet chuck 82, which projects from the distal end of housing h26, cutting wheel 22. The cutting wheel may be a diamond coated wheel or made from and covered by any other suitable material. A shield 86 and a wheel protective collar 88 (FIG. 2) covering the distal end of the shaft unit and the cutting wheel, respectively, protect the user from rotatable and cutting parts, which, in turn, are prevented from being damaged.

Figure 8:
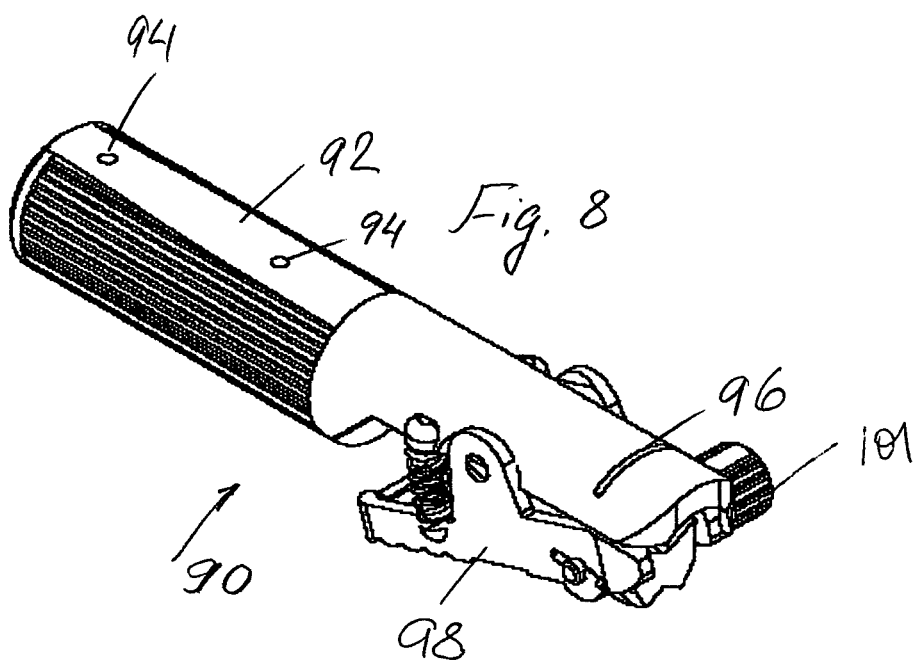
FIG. 8 is an isometric view of a spindle support unit.

FIG. 8 illustrates spindle support unit 90 provided with a generally tubular body 92 having its distal end formed with a slit 96, which is traversed by cutting 22 in the assembled state of inventive tool 10. A cable clamping assembly 98 is pivotally mounted to the distal end and is operable, as disclosed in U.S. Pat. No. 6,662,450 which, as mentioned above, is fully incorporated herein by reference, to receive a desired length of a cable. The proximal end of body 92 has a plurality of receptacles 94 configured to receive a hardware for coupling spindle unit 20 to support unit 90.

In use, screw thumb 72 is screwed out and cable clamping assembly is open so as to allow the user to insert a cable at the desired length and fixed it by a stop 101 (FIG. 8). Thereafter the user operates thumb screw 72 to adjust a penetration depth of cutting wheel 22 and processes shield 12 (FIG. 1). If thumb screw 72 cannot be operated so as to adjust the desirable depth of penetration or a fine adjustment is required, the user operates knob 40. Upon completion of a first stage, the user readjusts the desired length and depth of penetration so as to process core 14. If the desired adjustment of cutting wheel still cannot be accomplished, plate 32 is displaced relative to bracket 24, and the process can be continued. Thus, using inventive tool 10 allows processing the cable of the type disclosed above in a time-efficient and cost-effective manner, since only one tool is used for cutting both the shield and the core of the cable.

While the invention has been described in conjunction with specific embodiments, it is to be understood that many alternatives, modifications and variations will be apparent to those skilled in the art in light of the foregoing description without departing from scope of the invention as recited in the following claims.

What is claimed is:

1. A tool for processing a cable having a hardened shield and a core containing electrical connectors and surrounded by the hardened shield, the tool comprising:
   a spindle support unit operable to receive the cable;
   a spindle unit configured with
      a housing extending along a longitudinal axis and a cutting wheel mounted to the housing so as to rotate about the longitudinal axis, the housing being pivotally coupled to the spindle support unit so as to controllably vary a depth of penetration of the cutting wheel to sequentially cut the hardened shield and core of the cable, and
      a shaft unit mounted in the housing and a cutting wheel on a distal end of the shaft unit;
   a support bracket removably coupled to the spindle support unit and configured to receive the housing of the spindle unit so that the housing and the support bracket are operable to pivot relative to one another; and
   an actuating unit operable to pivot the spindle unit and the support bracket relative to one another so as to vary the depth of penetration of the cutting wheel into the cable, the actuating unit having a knob rotatably mounted to the support bracket and rotatably fixed to the housing of the spindle unit so that the housing is pivotal in response to a torque applied to the knob.

2. The tool of claim 1, wherein the actuating unit further comprises a post coupled to the knob and removably engaging the housing of the spindle unit.

3. The tool of claim 1, wherein the knob has a scale indicating an angular position of the housing relative to the support bracket, the relative angular position corresponding to a depth of penetration by the cutting wheel into the cable.

4. The tool of claim 1, wherein the actuating unit further comprises an endless guide surface configured to eccentrically guide the knob therealong so as to effect pivoting of the spindle unit upon rotating the knob.

5. The tool of claim 4, wherein the actuating unit further comprises a plate removably mounted to an outer surface of the support bracket, the plate having a recess provided with the endless guide surface.

6. The tool of claim 4, wherein the support bracket has a recess provided with the endless guide surface receiving the knob.

7. The tool of claim 1, further comprising a spring-loaded thumb screw penetrating the housing of the spindle unit and pressing against a bottom of the bracket so as to establish a desirable depth of penetration of the cutting wheel into a cable.

8. The tool of claim 1, further comprising a shield coveting the distal end of the shaft unit and a protective collar covering the cutting wheel.

9. The tool of claim 1, wherein the spindle support unit has a body provided with a slit and a cable clamping unit swingably mounted to the body so as to controllably receive and retain a desired length of the cable to be processed.

10. The tool of claim 9, wherein the spindle support unit and the spindle unit are coupled together so that the cutting wheel is aligned with the slit of the body of the spindle support unit and dimensioned to extend through the slit into the cable upon pivoting the spindle support unit and the spindle unit relative to one another.

11. The tool of claim 1, wherein the shaft unit comprises a shaft provided with at least one ball bearing and a collet chuck.

\* \* \* \* \*